March 3, 1959  C. L. GARRISON  2,875,648
GRINDING MACHINE AND WORK SUPPORTING MEANS THEREFOR
Filed March 14, 1957  5 Sheets-Sheet 1

FIG-1

INVENTOR:
CLIFFORD L. GARRISON
BY
Harry O. Ernsberger
ATTORNEY

March 3, 1959     C. L. GARRISON     2,875,648
GRINDING MACHINE AND WORK SUPPORTING MEANS THEREFOR
Filed March 14, 1957     5 Sheets-Sheet 2

INVENTOR:
CLIFFORD L. GARRISON.
BY
Harry O. Ernsberger
ATTORNEY

March 3, 1959    C. L. GARRISON    2,875,648
GRINDING MACHINE AND WORK SUPPORTING MEANS THEREFOR
Filed March 14, 1957    5 Sheets-Sheet 5

INVENTOR:
CLIFFORD L. GARRISON.
BY
Harry O. Erneberger
ATTORNEY.

United States Patent Office 2,875,648
Patented Mar. 3, 1959

2,875,648

GRINDING MACHINE AND WORK SUPPORTING MEANS THEREFOR

Clifford L. Garrison, Adrian, Mich., assignor to Oliver Instrument Company, Adrian, Mich., a corporation of Michigan Application March 14, 1957, Serial No. 646,023

11 Claims. (Cl. 76—41)

This invention relates to grinding apparatus and work supporting means therefor and more especially to a grinding apparatus and means embodied therein or associated therewith for supporting circular saws of various diameters whereby the teeth of the saws may be uniformly ground or resharpened.

The grinding or resharpening of the teeth of circular saws has presented many difficulties and particularly the grinding of saw teeth to secure substantially uniform grinding of the teeth by means of inexpensive grinding apparatus has been impractical and unsatisfactory. It has become conventional practice to fashion the extremities or tips of teeth of heavy duty circular saws with inserts of tungsten carbide, an extremely hard alloy, a factor which aggravates the difficulties of grinding or resharpening a tooth configuration formed of tungsten carbide. While tungsten carbide tools have been ground satisfactorily, the grinding apparatus heretofore used is of precision character and therefore costly. Such equipment is economically prohibitive for use in any but high production, large volume wood-working and metal working plants.

The comparatively small wood working and metal working plants have therefore, in the interest of economy, had their requirements of circular saws ground or resharpened at establishments equipped with costly precision grinding apparatus suitable for accomplishing the purpose. This practice carried on by small establishments requires the stocking of a substantial number of circular saws of various sizes to avoid interruption of production while saws are being ground or resharpened.

The present invention embraces the provision of relatively inexpensive grinding apparatus in combination with means for supporting circular saws for effecting grinding of the teeth of the saws in a comparatively short period of time, the grinding operations being capable of being performed by unskilled labor.

Another object of the invention is the provision of a grinding apparatus and work supporting means especially adapted for accommodating circular saws of different diameters whereby through manipulation of adjusting means, the work support is adaptable to support circular saws in a manner whereby the teeth thereof may be quickly and uniformly ground or sharpened.

Another object of the invention is the provision of a grinding apparatus and means for supporting circular saws wherein the sides of the teeth as well as the peripheral regions of the teeth may be readily ground or resharpened by simple adjustments of the grinding head and the saw or work supporting means.

Another object of the invention is the provision of means embodied in or adapted to be associated with grinding apparatus whereby the mandrel or arbor supporting a circular saw is mounted so as to be angularly adjustable to facilitate grinding the sides of or relief angles upon the teeth.

Another object of the invention is the provision of an inexpensive grinding apparatus and saw supporting means adapted for rapidly and satisfactorily grinding or sharpening saw teeth formed of tungsten carbide or formed with inserts or tungsten carbide or other hard materials.

Still a further object of the invention is the provision of a simple, yet effective means for avoiding or eliminating vibration of a circular saw during operations of grinding or sharpening the teeth thereof.

Further objects and advantages are within the scope of this invention such as relate to the arrangement, operation and function of the related elements of the structure, to various details of construction and to combinations of parts, elements per se and to economies of manufacture and numerous other features as will be apparent from a consideration of the specification and drawing of a form of the invention, which may be preferred, in which:

While the arrangement of the invention illustrated in the drawings is adapted for supporting and grinding both the peripheral regions and lateral or side faces of the teeth of circular saws ranging in diameters from about six inches to forty eight inches including grinding saw teeth formed of tungsten carbide alloy, it is to be understood that the arrangement may be utilized for grinding or for performing work operations upon other generally circular bodies or discs wherever the same may be found to have utility.

Referring to the drawings in detail, and initially to the arrangement disclosed in Figures 1 through 6, the grinding machine or apparatus includes a frame or base 10 which is of hollow configuration formed of cast metal and configurated with supporting feet 11.

The upper portion of the frame or base 10 is shaped to support a member 15 which is adapted to carry a grinding head 17, a reciprocable arbor 19 supporting the head 17 and a motor 21 or other suitable means for driving a grinding wheel 22.

Figure 6:
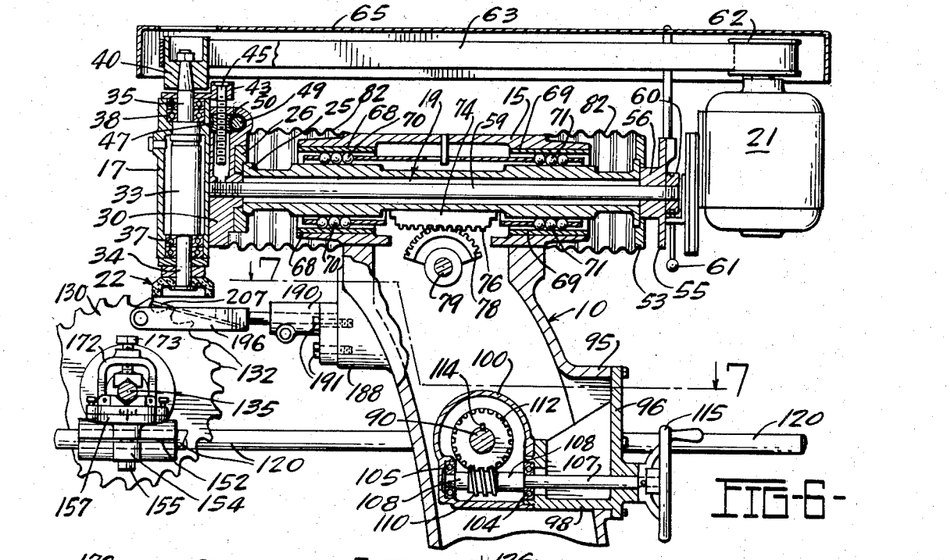
Figure 6 is a longitudinal sectional view taken substantially on the line 6—6 of Figure 2.

The member 15 is shaped or configurated to provide a hollow chamber through which extends a reciprocable element or ram 19 as shown in Figure 6. The arrangement of ram 19 and supporting means therefor forms the subject matter disclosed and claimed in my prior Patent No. 2,629,972 granted March 3, 1953.

The ram 19 is provided at its forward end with a flange 25 secured to a plate 26. Supported upon the circular plate 26 is a member 30 which supports the housing 17. The member 30 is formed with vertically extending ways 31 shown in Figures 2 and 3 within which is slidably mounted the cylindrically shaped housing 17. The member 30 is arranged to be rotated relative to the member 26 to adjust the grinding wheel assembly about the axis of the mandrel 19.

The housing 17 is of hollow configuration in which is disposed a shaft 33 formed at its end regions with tenon portions 34 and 35 of reduced diameter. The lowermost tenon 34, mounted in anti-friction or ball bearings 37, is arranged to support the grinding wheel 22. The upper tenon portion mounted in ball bearings 38 accommodates a pulley 40.

Means is provided for adjusting the housing 17 carrying the grinding wheel construction transversely of the axis of the arbor 19. Secured to the upper portion of the housing 17 is a member 43 projecting rearwardly of the housing, the projection 43 being fixedly secured to a threaded shaft 45. A worm wheel 47 is disposed in a hollow portion of member 30 and is in threaded engagement with the threaded shaft 45 carried by the projection 43.

The member 30 journally supports a shaft 49 provided with a worm 50 meshing with the worm wheel 47, the extremities of the shaft 49 being equipped respectively with manipulating means in the form of hand wheels 51, this arrangement facilitating adjustment of the housing 17 from either side of the machine. Thus rotation of either of the hand wheels 51 rotates shaft 49 and worm 50, the latter rotating the worm wheel 47 threadedly connected with the shaft 45 to adjust the position of the housing 17 and hence the grinding wheel 22 relative to the arbor 19.

The rear extremity of the ram 19 is provided with a circular plate or member 53. Disposed adjacent the circular member 53 is a member 55 having a tenon portion 56 which extends into a central bore formed in the plate 53 as shown in Figure 6. Extending through the hollow interior of the ram 19 is a rod or shaft 59, the forward end of the shaft being threaded into a threaded bore formed in the member 30. The rear extremity of the shaft 59 is threaded to receive a clamping nut 60 which is provided with a manipulating handle 61.

When the nut 60 is threaded relative to the shaft 59 in a direction away from the member 55, this affects a release of members 30 and 56 allowing these members and elements carried thereby to be rotated about the axis of the shaft 59 for the purpose of changing the relative angular position of the grinding wheel 22. The motor 21 is equipped with a pulley 62 which drives the pulley 40 through the medium of a driving belt 63. A guard 65 encloses the belt 63 and the pulleys 40 and 62 in the manner illustrated in Figures 1 and 6.

The longitudinally spaced portions of the member 15 are provided with sets of longitudinally extending ways adapted to accommodate groups of bearing balls 70 and 71 to facilitate longitudinal reciprocatory movements of the ram 19 and the elements carried thereby. A handle 72 is provided to reciprocate the ram 19 and the grinding wheel. The ways engaged by the bearing balls 70 and 71 are provided with automatic take-up means of the character disclosed and claimed in my Patent No. 2,629,972.

Figure 1:
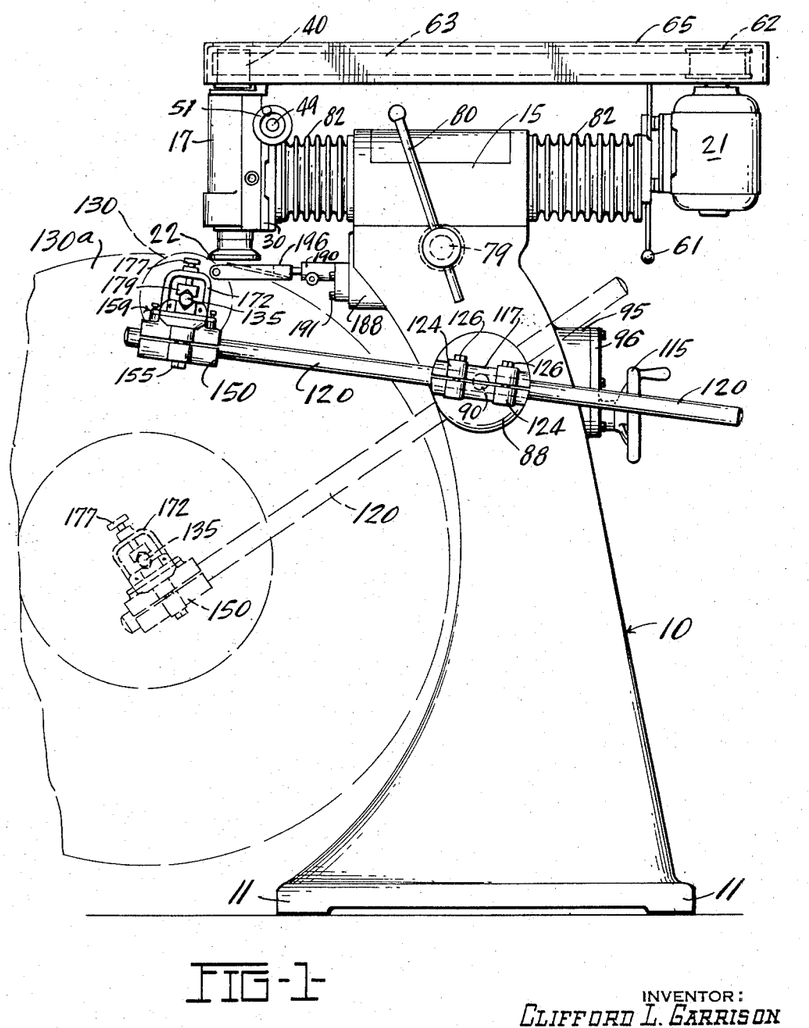
Figure 1 is a side elevational view showing a form of grinding apparatus or machine and a form of work supporting means of the invention.
Figure 4:
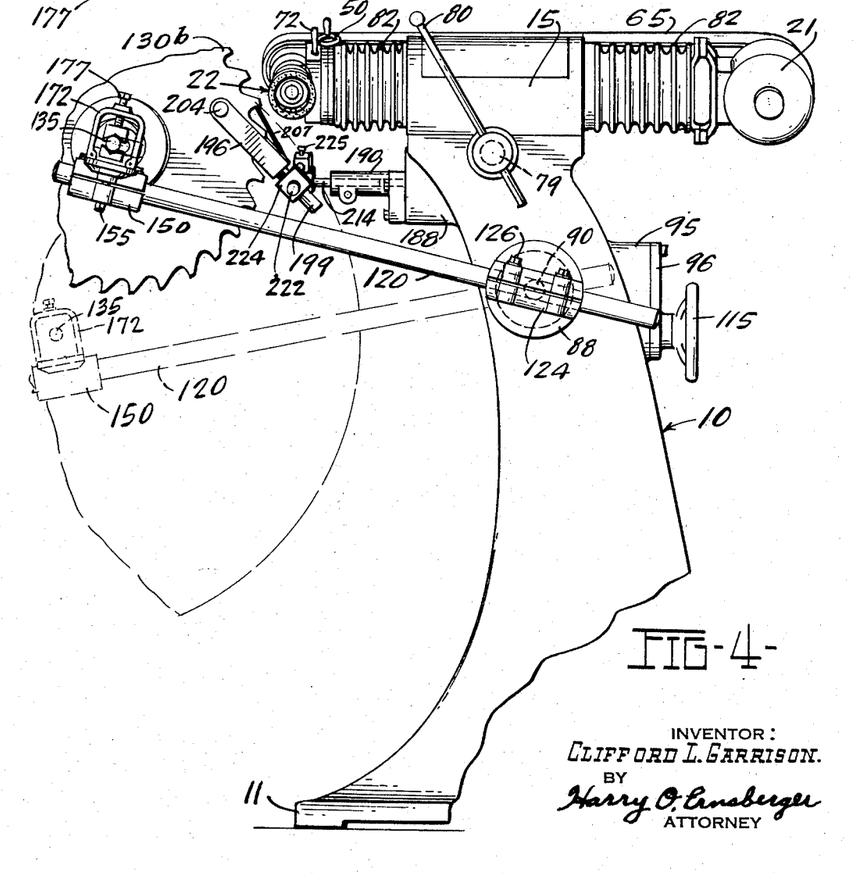
Figure 4 is a side elevational view of the grinding machine and work supporting means with the grinding head and work supporting means in position for grinding lateral regions of the teeth of a circular saw.

A bar 74 carried by the ram 19 is provided with a series of rack teeth 76 which mesh with the teeth of a sector 78 supported upon a shaft 79. The shaft 79 extends transversely of the frame 10 and is journally supported thereby. The shaft extends exteriorly of the frame 10 as shown in Figures 1 and 4 and is equipped with an operating arm 80 for rotating the sector 78 to cause longitudinal reciprocation of the ram 19.

The end regions of the member 15 and the members 30 and 53 are connected by means of flexible bellows 82 as shown in Figure 6 to prevent dust and foreign matter entering the bearing ways 68 and the ball arrangements 70 and 71 but permitting reciprocatory movements of the ram 19 and parts carried thereby.

The invention is inclusive of an arrangement for supporting circular saws or other circular work upon which grinding operations are to be performed.

Figure 7:
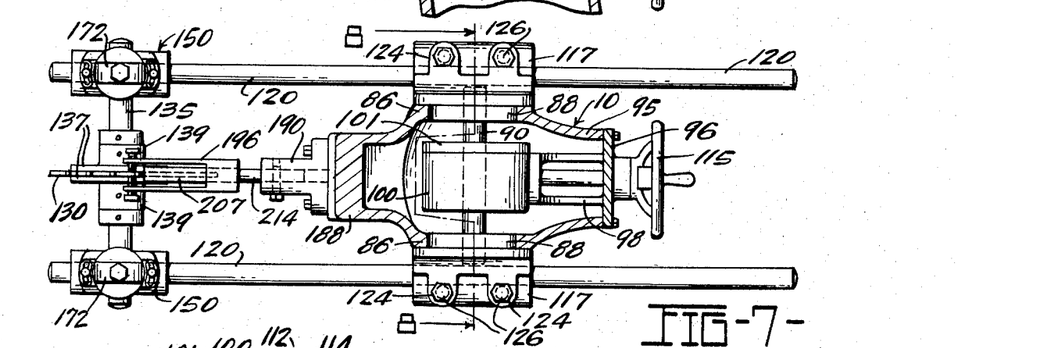
Figure 7 is a horizontal sectional view taken substantially on the line 7—7 of Figure 6.
Figure 8:
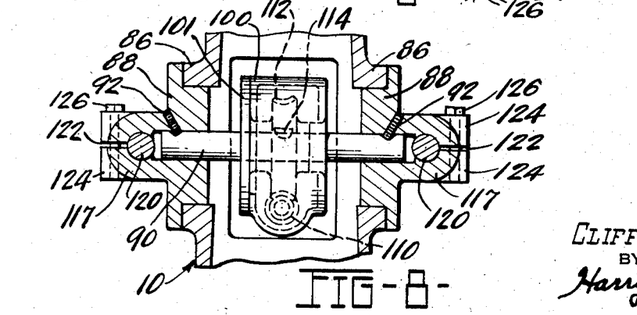
Figure 8 is a transverse detail sectional view taken substantially on the line 8—8 of Figure 7.

With particular reference to Figures 6 through 8, it will be seen that opposed wall portions of the frame 10 are formed with transversely aligned circular bosses 86 which are bored to receive and rotatably support trunnion means or members 88. The trunnion members 88 are provided with axial bores adapted to receive end regions of a shaft 90 which is held in place by means of securing screws 92 shown in Figure 8.

The frame 10 is formed with a boss portion 95 which forms a support for a flange 96 of a fitting 98 which extends into the hollow interior of the frame 10. Secured to the fitting 98 is an enclosure or housing 100 provided with an end plate 101 as shown in Figures 7 and 8. The fitting 98 is equipped with an anti-friction or ball bearing 104 and the housing 100 is equipped with a ball bearing 105, the bearings 104 and 105 being aligned and journally supporting a shaft 107.

The shaft 107 is provided with enlarged portions 108 which engage the inner races of the ball bearings 104 and 105 to prevent relative endwise movement of the shaft 107. The portion of the shaft 107 intermediate the enlarged portions 108 is formed with a worm 110 which meshes with a worm wheel 112 secured on the shaft 90 by means of a key 114. The shaft 107 extends exteriorly of the fitting 98 and is equipped with a manipulating or hand wheel 115.

As particularly shown in Figures 1, 7 and 8, the trunnion members 88 are each formed with elongated semi-cylindrical portions 117, each of the semi-cylindrical portions being provided with a longitudinally extending bore or passage, each passage adapted to receive and accommodate an extension such as a shaft, rod or bar 120. Each of the semi-cylindrical portions 117 of the trunnions is provided with a longitudinally extending slot 122. Each of the portions 117 is formed with longitudinally spaced boss portions 124, the boss portions being bored and the bores in the lower portions threaded to receive bolts 126.

The bolts 126 are adapted to be drawn up to securely clamp the semi-cylindrical portions 117 of the trunnions 88 to the bars or rods 120 as shown in Figures 1, 6 and 7, the trunnions 88 being disposed so as to position the bars or rods 120 in parallel relationship. The bars or rods 120 are of substantial length and by manipulation of the clamping screws 126 the bars may be adjusted longitudinally of the bores in the trunnions 88 to provide adjustment for the bars 120.

Figure 2:
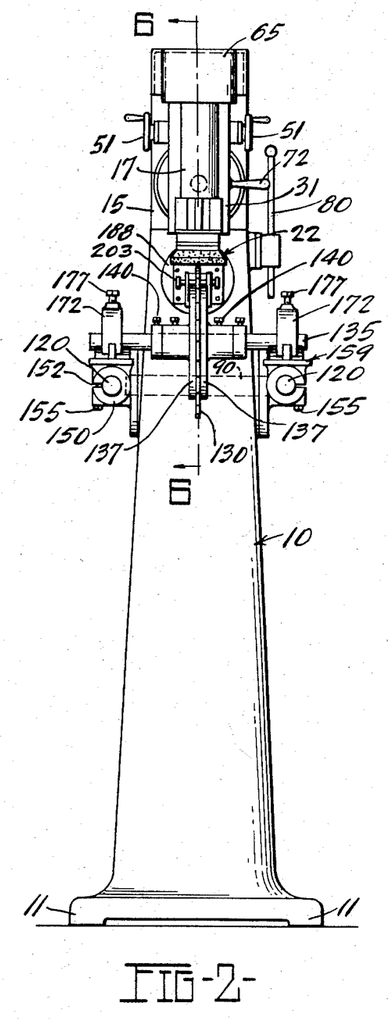
Figure 2 is a front end view of the grinding machine and work supporting means illustrating the grinding head in a position for grinding peripheral faces or regions of the teeth of a circular saw.

Means are supported upon the bars or rods 120 for mounting circular saws or other circular work in position to be engaged by the grinding wheel 22. Figures 2 and 6 illustrate a saw 130 of comparatively small diameter positioned whereby the grinding wheel 22 engages the exterior peripheries of the teeth 132 to grind or sharpen the same.

A mandrel 135 is adapted to support a circular saw during the grinding operations. The mandrel 135 extends through a central axial opening of standard size in the circular saw.

Arranged on the mandrel 135 at each side of the saw 130 is a disc-like member 137 which directly engages the faces of the saw as shown in Figure 7. Each of the disc-like members 137 is formed with a hub portion 139, each of the hub portions being formed with radially threaded openings to accommodate screws 140 which may be drawn up into engagement with the periphery of the mandrel 135 to hold the saw 130 against endwise movement relative to the mandrel but permitting rotation of the saw relative to the mandrel and the disc-like members 137 to facilitate successive grinding of the teeth.

The end regions of the mandrel 135 are supported upon the rods or shafts 120 by means of mounting constructions which provide for angular adjustment of the mandrel and the saw carried thereby to facilitate grinding operations being performed upon the side or lateral faces of the saw teeth. The mounting means is illustrated in Figures 1 through 7, 15 and 16. As the mandrel mounting or supporting means carried by the shafts or rods 120 are identical, a description of one will suffice for both.

As particularly shown in Figures 2, 6, 7, 15 and 16 each mounting means is inclusive of a substantially cylindrical member 150 having a longitudinally extending bore formed therein of a diameter to snugly receive and accommodate a shaft 120.

Figures 12, 13, 15, 16:
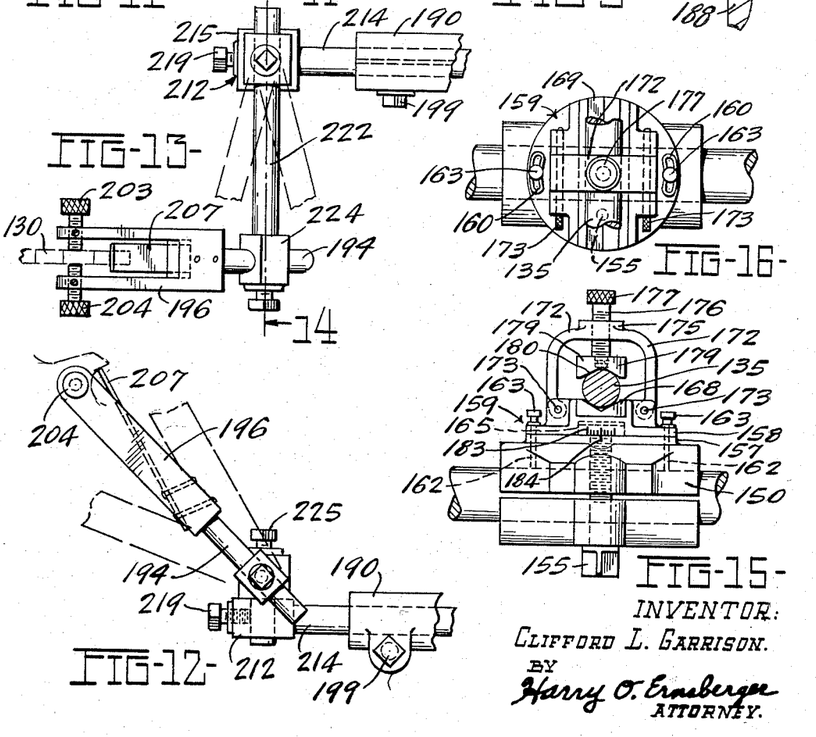
Figure 12 illustrates a form of lip rest arrangement engagable with a circular saw for preventing vibration of the saw when the lateral faces of the saw teeth are being ground.
Figure 13 is a top plan view of the arrangement shown in Figure 12.
Figure 15 is an elevational view of one of the mandrel supporting means.
Figure 16 is a top plan view of the construction shown in Figure 15.

One wall zone of the member 150 is formed with a longitudinally extending slot 152 as will be seen from Figures 2, 6 and 15. The portions of member 150 adjacent the slot 152 are formed with bosses 154 provided with openings to accommodate locking bolts 155 which, when drawn up, securely hold the mounting members 150 to the shafts 120.

Each member 150 is formed with a circular boss 157 having a flat upper surface which mates with a circular boss portion 158 of a member 159. As particularly shown in Figure 16, the boss portion 158 is formed with slots 160 which accommodate locking screws 162, the screws being provided with knurled heads 163 for ease in manipulation. The screws 162 are threaded into threaded bores formed in the portion 150.

The member 159 is formed with a circular recess at the axis of the circular boss 157 to accommodate an upwardly extending circular tenon 165 carried by or formed integrally with the member 150. The tenon 165 is of a diameter to be snugly, yet rotatably received into the circular recess so that the member 159 may be rotated about the axis of the tenon 165. The member 159 is formed with a portion arranged to receive a block 168 formed with a V-shaped configuration 169 adapted to support a region of the mandrel 135.

A yoke or U-shaped member 172 is secured to the member 159 by means of pins 173 as shown in Figures 15 and 16. The bight portion or central region of the yoke 172 is formed with a boss 175 having a threaded opening to receive a screw 176, the screw having a knurled head portion 177 to facilitate manipulation thereof.

The extremity of the screw 176 supports a second block 179 which has a V-shaped configuration 180 for engagement with the mandrel 135 in the manner illustrated in Figure 15. The block 179 is supported for movement about the axis of the screw 176 to provide for aligning the block 179 with the mandrel supported in the block 168.

A peripheral region of the boss portion 158 is provided with a series of graduations 183 indicating degrees which are arranged to cooperate with an index 184 to indicate the position of rotation of the member 159 relative to the member 150 so that proper angularity of the position of the mandrel 135 may be assured.

As shown in Figures 6 and 7, one of the mounting units is carried by each of the shafts 120 to support the mandrel 135. The grinding wheel 22, in the position shown in Figure 6, is arranged to grind the peripheral surface regions of the teeth 132 of the saw 130. When this type of grinding operation is being performed, the members 150 are adjusted on the shafts or extensions 120 so that the mandrel 135 is disposed at right angles to the longitudinal axes of shafts 120 as shown in Figure 7.

As shown in Figure 1, the shafts 120 and mounting members 150 may be adjusted to support a large circular saw of a diameter of approximately forty-eight inches, the outline of the saw 130a being shown in broken lines in Figure 1.

In order to accommodate saws of the large diameters, the bolts 126 provided on the trunnion members 88 may be released and the rods 120 extended to the required distance to accommodate the saw. The hand wheel 115 may be rotated and through the medium of the gearing 110, 112, so that the angularity of the shafts 120 may be varied to bring the peripheral region of the saw into a position whereby the grinding wheel 22 may be brought into grinding engagement with the saw teeth.

The arrangement of the invention is inclusive of an antivibration means or lip rest arranged to engage one or both lateral faces or surfaces of a saw during grinding operations to minimize or eliminate vibration of the saw or other work to be engaged by the grinding wheel. A form of antivibration means or lip rest is shown in Figures 1 and 9 through 11. The hollow column or frame 10 of the boss portion 188 which forms a support for a bracket or grinding machine is formed with a forwardly projecting member 190 secured to the boss by means of a bolt 191. The bracket 190 is bored to accommodate a tenon 194 formed upon the bight portion of a U-shaped member or lip rest 196. The bracket 190 is formed with a slot 197 and with a boss portion 198 which receives a clamping screw 199. The tenon 194 may be rotatably and longitudinally adjusted relative to the bracket 190 and member 196 held in adjusted position by drawing up the clamping bolt 199.

The leg portions 200 and 201 of the member or lip rest 196 are spaced to accommodate a peripheral region of a saw 130. The leg portions 200 and 201 are formed with threaded openings to receive knurled adjusting screws 203 and 204, the screws being adapted to be drawn up into engaging relation with the saw 130 with sufficient force to prevent or substantially eliminate vibration of the saw but to permit relative rotation of the saw on the mandrel 135 so as to facilitate incremental or step-by-step rotation of the saw to successively position the teeth thereof so as to be engaged by the grinding wheel 22.

Figures 9, 10, 11, 14:
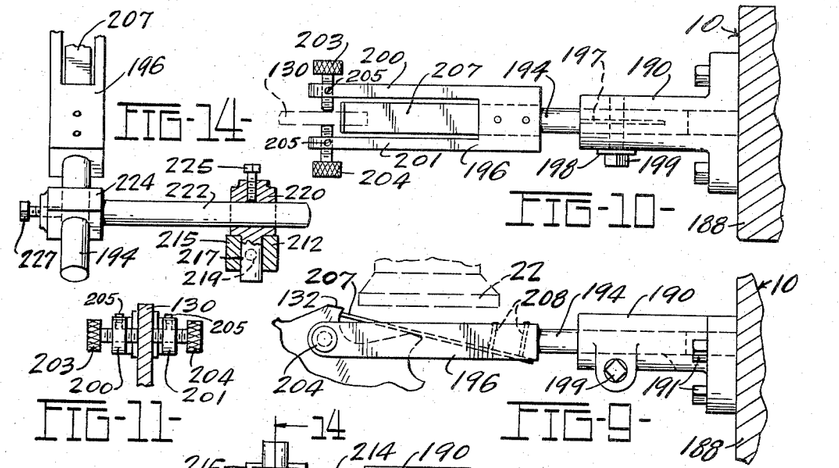
Figure 9 is a detail elevational view illustrating a form of lip rest or antivibration means for the work to be ground.
Figure 10 is a top plan view of the arrangement shown in Figure 9.
Figure 11 is an end view of the arrangement shown in Figure 9.
Figure 14 is a detail sectional view taken substantially on the line 14—14 of Figure 13.

Thus, the arrangement shown in Figures 9 through 11 constitutes an antivibration means or lip rest arrangement engageable with a region of a saw adapted to be engaged by the grinding wheel. While the arrangement illustrated includes two saw engaging means, members or screws 203 and 204 to reduce vibration of the saw, it is to be understood that a single member arranged to exert lateral pressure against the saw may be utilized under certain grinding conditions to minimize or reduce vibration of the saw.

The lip rest arrangement as shown in Figures 9 and 10 includes a plate or member 207 preferably of flexible metal which is secured to member 196 by means of rivets 208. The distal end of the flexible plate 207 is arranged to engage the leading wall or surface of a saw tooth 132 as shown in Figure 6 whereby the saw occupies a proper position relative to the grinding wheel during the grinding of each tooth.

Upon completion of the grinding of a tooth, the circular saw may be rotated to bring the next succeeding tooth into proper engagement with the indexing plate or member 207, and in this manner the teeth are all ground to uniform dimension. As shown in Figure 1 the lip rest arrangement is adaptable for engagement with saws of diameters ranging from about six inches or less to forty-eight inches in a region adjacent the engagement of the grinding wheel with the saw teeth to reduce or eliminate vibration of the saw.

Figure 3:
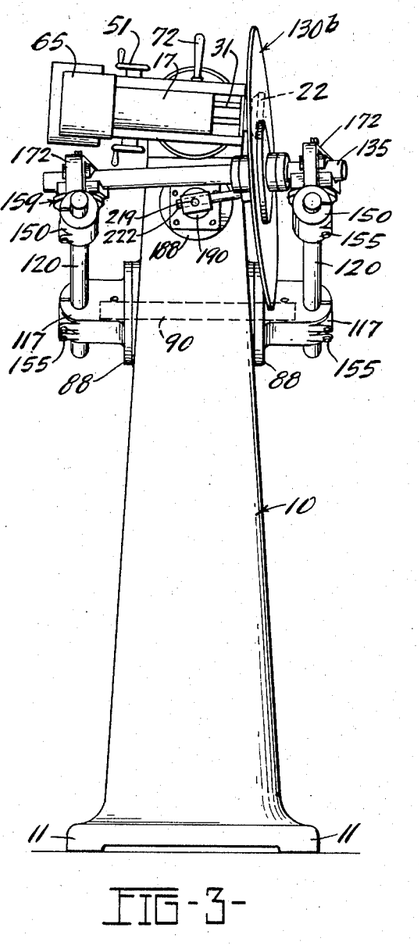
Figure 3 is a front end view similar to Figure 2 illustrating the grinding head and work supporting means in a position for grinding lateral or side faces of the teeth of a circular saw.
Figure 5:
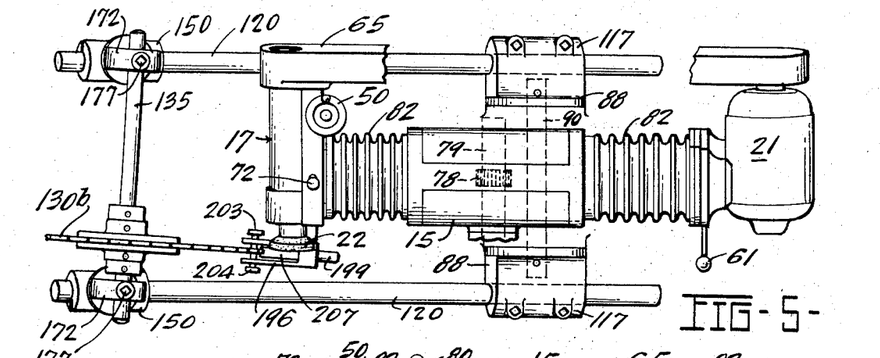
Figure 5 is a top plan view of the apparatus illustrated in Figure 4.

The means supporting the mandrel 135 which carries a circular saw during grinding operations and a lip rest arrangement are adapted to facilitate the grinding of the side or lateral faces of the saw teeth. The positioning of the mandrel and its supporting means for grinding lateral faces of saw teeth is shown in Figures 3, 4 and 5. It should be noted that the grinding wheel supporting arrangement is moved or adjusted to a position wherein the axis of the grinding wheel approaches a horizontal position so as to bring the grinding wheel 22 into proper relation with the sides of the teeth of the saw to grind a proper relief angle on the teeth.

With particular reference to Figure 5, it will be seen that the mounting means 150 on the uppermost bar or shaft 120 in the drawing is at a lesser distance from the trunnions 88 than the mounting means 150 on the lowermost shaft 120. This provides for an angular positioning of the saw supporting mandrel 135 which is out of normal or right angular relationship with the axes of the shafts 120.

This angularity of the mandrel disposes the circular saw 130b in a plane at an acute angle to the longitudinal axis of reciprocatory movement of the means or ram 19 supporting the grinding wheel 22. Thus at each reciprocation of the grinding head or housing 17, the grinding wheel is brought into engagement with a lateral face of a tooth on the saw. Through this arrangement, compound relief angles, viz. axial and radial relief, may be ground on the teeth of the saw.

Figures 12 through 14 illustrate an arrangement of antivibration means or lip rest arrangement for reducing or eliminating vibration of a saw when lateral faces of the teeth are being ground. In this arrangement the lip rest assembly including member 196, saw engaging screws 203 and 204 and the indexing plate 207 is utilized in a position offset from the bracket 190 which is carried by the grinding machine frame 10.

In this form of lip rest arrangement a member 212 is formed with a tenon 214 which extends into the bore in the bracket 190 and may be clamped in adjusted position by means of the securing bolt 199. The member 212 is formed with a head portion of generally cubical shape 215 which is formed with an opening adapted to snugly receive a tenon 217 formed on a member 220. The head portion 215 has a threaded opening to receive a screw 219 aadpted to be drawn up against the tenon 217 to hold the member 220 in adjusted position.

The member 220 is bored to receive a shank or tenon 222 which is formed with a cubically shaped portion 224. A screw 225 is carried by member 220 and is adapted to be drawn up to secure the shank 222 in adjusted position in the member 224.

The head portion 224 is bored to receive the tenon or shank 194 of lip rest member 196 which in this arrangement is supported by the bracket 190 through the medium of members 215 and 224. The head portion 224 is equipped with a screw 227 adapted to be drawn up into engagement with the tenon 194 to hold the member 196 in a selected position of adjustment depending upon the diameter of the saw carried upon the mandrel 135. Figures 4 and 5 illustrate the lip rest arrangement in engagement with a circular saw 130b with the grinding wheel 22 and its supporting means in a position to engage and grind the lateral or side faces of the teeth of the saw.

The lip rest or saw engaging arrangement illustrated in Figures 12 through 14 provides for universal adjustment of the lip rest member 196 with respect to the bracket 190 carried by the frame 10. The member 220 may be rotated and moved relative to the member 212 and the shank 222 of member 224 may be rotated and moved axially with respect to member 220. The member 196 may be rotated and moved longitudinally of member 224. The screws 203 and 204 of the antivibration means may be engaged with a region of the saw adjacent the zone of contact of the grinding wheel with the teeth of the saw whether the peripheral regions of the teeth are being ground as shown in Figures 2 and 6 or whether the lateral or side faces of the teeth are to be ground and the elements arranged as shown in Figures 3, 4 and 5. The saw engaging member or screws 203 and 204 may be locked in proper positions by means of headless locking screws 205.

The use of the arrangement in grinding peripheral regions or surfaces of the saw teeth is as follows: The members or extensions 120 are adjusted relative to the trunnion means or members 88 to accommodate the mounting means 150 for mounting a saw of a particular diameter.

Thus, as shown in Figure 1, the extensions or members 120 project farther from the trunnions 88 when a saw 130a of large diameter is to be ground than when a saw of smaller diameter is mounted for grinding.

The hand wheel 115 is rotated which, through the medium of the worm 110 and the worm gear 112, effects an angular adjustment of the extensions or bars 120 and the saw mandrel mounting means 150 to bring the teeth of the saw in a region to be engaged by the grinding wheel 22. The grinding wheel 22 in the position shown in Figures 1, 2 and 6 is adapted to grind the peripheral surfaces or tips of the teeth. The operator accomplishes this by oscillating the arm or handle 80 about the axis of shaft 79 which moves the toothed sector 78 and rack 74 to cause reciprocatory movement of the ram 19 carrying the grinding wheel. As shown particularly in Figure 2, the mandrel 135 is in parallelism with the axis of the shaft 90. Each tooth is ground individually by movement of the grinding wheel 22 and the indexing plate 207 holds or positions each tooth in a proper position to be engaged by the grinding wheel so that the teeth are ground to uniform dimensions.

Substantially the same operations are carried on in grinding the lateral or side faces of the saw teeth. The position of the saw, the supporting mandrel 135 and the mounting means 150 are best illustrated in Figures 3, 4 and 5 in carrying out side face grinding operations.

By manipulating or adjusting the mounting means for the mandrel 135 along the extensions 120, the saw may be positioned so that the sides of the teeth may be ground by reciprocatory movement of the grinding machine ram 19 with the axis of the grinding wheel approaching a horizontal position as shown in Figures 3, 4 and 5. The lip rest or antivibration means for a saw is adaptable for use with any diameter of saw within the capacity of the machine and is usable in holding the saw against vibration in grinding the peripheral regions or the lateral or side faces of the teeth.

The arrangement of the invention is especially adapted for grinding saws in which the teeth are formed of tungsten carbide or are provided with inserts formed of tungsten carbide or other hard alloy. From the foregoing it will be apparent that the arrangement of the invention provides a comparatively inexpensive fully adjustable means for grinding large or small diameter saws by simply making the proper adjustments of the saw mounting means and the vibration damping means engageable with the saw.

It is apparent that, within the scope of the invention, modifications and different arrangements may be made other than is herein disclosed, and the present disclosure is illustrative merely, the invention comprehending all variations thereof.

I claim:

1. Apparatus for supporting circular saws for use with a grinding machine having a frame and a ram reciprocable on the frame and carrying a grinding wheel and driving means therefor, a saw supporting arrangement including a member journally supported on the frame and provided with extension means, a mandrel upon which a saw is mounted, adjustable means carried by said extension means and supporting the mandrel whereby the mandrel may be angularly adjusted relative to the extension for grinding the lateral faces of the teeth of a circular saw, and means including gearing for adjusting the journally supported member about its axis relative to the frame.

2. Apparatus for supporting circular saws for use with a grinding machine having a frame and a ram reciprocable on the frame and carrying a grinding wheel and driving means therefor, a saw supporting arrangement including trunnion means journally supported on the frame and formed with spaced extensions, a mandrel upon which a saw is mounted intermediate the extensions, adjustable means carried by said extensions and supporting the mandrel whereby the mandrel may be angularly adjusted relative to the extensions for grinding the lateral faces of the teeth of a circular saw, and means for adjusting the trunnion means relative to the frame.

3. The combination with a grinding machine having a frame supporting a grinding wheel and driving means therefor, means for supporting a circular saw the teeth of which are to be ground including means adjustably supported upon the frame, a pair of rods supported upon said means, a mandrel carried by the rods and arranged to support a circular saw to be ground, said rods being adjustable relative to said means for accommodating circular saws of different diameters, and articulated connections between the mandrel and rods for varying the angular position of the mandrel.

4. Apparatus for supporting circular saws for use with a grinding machine having a frame and a ram reciprocable on the frame carrying a grinding wheel and driving means therefor, saw supporting means including a fitting journally supported upon the frame, means for adjusting the fitting about an axis, a pair of members carried by said fitting, said members being individually adjustable longitudinally relative to the fitting, a mandrel, adjustable means providing an articulate connection between said mandrel and the members whereby said mandrel is adjustable relative to a circular saw to effect a grinding of the sides of the saw teeth, and a lip rest engageable with the region of the saw adjacent a tooth being engaged by the grinding wheel.

5. Apparatus of the character disclosed for use with a grinding machine having a frame and a ram reciprocable on the frame carrying a grinding wheel and driving means therefor, means for supporting a circular saw including trunnion means journally supported upon the frame, means for adjusting the trunnion means about an axis, a pair of shafts carried by the trunnion means, said shafts being individually adjustable lengthwise relative to the trunnion means, a mandrel, means carried by the shafts providing articulate connections between said mandrel and the shafts whereby said mandrel is adjustable to effect a grinding of the lateral faces of the saw teeth, and a lip rest engageable with the saw to minimize vibration of the saw during grinding operations.

6. Apparatus for supporting circular saws for use with a grinding machine having a frame and a ram reciprocable on the frame and carrying a grinding wheel and driving means therefor, a pair of fittings, said fittings being journally supported upon the frame, means including gearing for adjusting the fittings relative to the frame, a shaft carried by each of the fittings, a mandrel adapted to support a circular saw, means carried by the shafts supporting the mandrel, said mandrel supporting means being adjustable for changing the angular position of the saw carried thereby, a lip rest adapted to engage the saw adjacent the region of engagement of the grinding wheel with the saw, said lip rest being adjustably supported on the frame.

7. Apparatus for supporting circular saws for use with a grinding machine having a frame carrying a grinding wheel and driving means therefor, the frame being formed with journal means, trunnions journaled on said means, saw supporting means carried by said trunnions, said trunnions being rotatable to vary the relative position of the saw supporting means, gearing for rotating said trunnions, a mandrel forming a mounting for the saw, adjustable means arranged between the saw supporting means and the mandrel for varying the angular position of the mandrel relative to the grinding wheel, and a lip rest carried by the frame and engageable with the sides of the saw for reducing vibration of the saw during grinding operations.

8. Apparatus of the character disclosed for use with a grinding machine having a frame and a rotatable grinding wheel movable into and out of engagement with teeth to be ground on a circular saw including, in combination, means journally supported upon the frame and having extensions movable in planes normal to the axis of said means, a mandrel adapted to support a circular saw, mounting means carried by the extensions arranged to support the mandrel, said mounting means being adjustable to vary the angularity of the axis of the mandrel relative to the axis of said journally supported means whereby the lateral faces of the saw teeth may be engaged by the grinding wheel, and means supported by the frame and arranged for engagement with a lateral face of the circular saw to reduce vibration of the saw during grinding operations.

9. Apparatus of the character disclosed for use with a grinding machine having a frame and grinding wheel mounted thereon, in combination, means for supporting a circular saw including members journally supported upon the frame, a mandrel adapted to carry the circular saw, mounting means disposed between each of the members and the mandrel, said mounting means being arranged for limited universal adjustment for varying the angularity of the mandrel relative to the grinding wheel, means securing the mounting means in adjusted position, the grinding wheel being adjustable to engage the peripheral regions and side faces of the teeth of the saw, means for minimizing vibration of the saw during grinding operations including a bracket carried by the frame, an element associated with the bracket formed with means arranged to straddle the circular saw and engage lateral surfaces thereof in the region of engagement of the grinding wheel with the saw, and means for adjustably supporting the element.

10. Apparatus of the character disclosed for use with a grinding machine having a frame and grinding wheel mounted thereon, in combination, means for supporting a circular saw including members journally supported upon the frame, a mandrel adapted to carry the circular saw, mounting means disposed between each of the members and the mandrel, said mounting means being arranged for adjustment for varying the angularity of the mandrel relative to the grinding wheel, the grinding wheel being adjustable to engage and abrade the peripheral regions and side faces of the teeth of the saw, means for minimizing vibration of the saw during grinding operations including a bracket carried by the frame, an element adjustably associated with the bracket and formed with means arranged to straddle the circular saw adjacent the region of engagement of the grinding wheel with the saw, and means carried by the element adapted to engage the side faces of the saw.

11. Apparatus of the character disclosed for use with a grinding machine having a frame and a rotatable grinding wheel movable into and out of engagement with teeth to be ground on a circular saw including, in combination, trunnion means journally supported upon the frame and having extensions movable in planes normal to the axis of the trunnion means, a mandrel adapted to support a circular saw, mounting means carried by each of the extensions arranged to support the mandrel, said mounting means being adjustable to vary the angularity of the axis of the mandrel relative to the axis of said journally supported trunnion means whereby the lateral faces of the saw teeth may be engaged by the grinding wheel, and a lip rest supported by the frame and having means arranged for engagement with the lateral faces of the circular saw to reduce vibration of the saw during grinding operations, said lip rest being adjustably supported to accommodate the position of the saw being ground.

References Cited in the file of this patent
UNITED STATES PATENTS

| | | |
|---|---|---|
| 112,838 | Otis | Mar. 21, 1871 |
| 330,399 | Herhold et al. | Nov. 17, 1885 |
| 391,176 | Mealey | Oct. 16, 1888 |
| 543,204 | Bauer | July 23, 1895 |
| 1,179,752 | Pangburn | Apr. 18, 1916 |
| 1,551,230 | Armstrong | Aug. 25, 1925 |